United States Patent
Edwards (10) Patent No.: US 8,756,991 B2
(45) Date of Patent: Jun. 24, 2014

(54) PNEUMATIC INDICATOR FOR DETECTING LIQUID LEVEL

(75) Inventor: David H. Edwards, Ann Arbor, MI (US)

(73) Assignee: Graco Minnesota Inc., Minneapolis, MN (US)

( * ) Notice: Subject to any disclaimer, the term of this patent is extended or adjusted under 35 U.S.C. 154(b) by 628 days.

(21) Appl. No.: 12/912,101

(22) Filed: Oct. 26, 2010

(65) Prior Publication Data

US 2012/0096938 A1    Apr. 26, 2012

(51) Int. Cl.
*G01F 23/00* (2006.01)

(52) U.S. Cl.
USPC .......................................... 73/290 R

(58) Field of Classification Search
USPC .................................. 73/299, 301
See application file for complete search history.

(56) References Cited

U.S. PATENT DOCUMENTS

| | | |
|---|---|---|
| 4,998,585 A | 3/1991 | Newcomer et al. |
| 5,146,998 A | 9/1992 | Cordry et al. |
| 5,147,184 A | 9/1992 | Newcomer et al. |
| 5,147,185 A | 9/1992 | Niehaus et al. |
| 5,259,450 A | 11/1993 | Fischer |
| 5,261,348 A | 11/1993 | Niehaus et al. |
| 5,358,037 A | 10/1994 | Edwards et al. |
| 5,358,038 A | 10/1994 | Edwards et al. |
| 5,495,890 A | 3/1996 | Edwards et al. |
| 6,039,546 A | 3/2000 | Edwards et al. |
| 6,298,721 B1 * | 10/2001 | Schuppe et al. ............... 73/299 |
| 6,418,788 B2 * | 7/2002 | Articolo ........................ 73/314 |
| 6,456,201 B1 | 9/2002 | Mioduszewski et al. |
| 6,508,310 B1 | 1/2003 | Mioduszewski et al. |
| 6,525,655 B2 * | 2/2003 | Huang ......................... 340/442 |
| 7,347,255 B2 | 3/2008 | Fischer et al. |
| 7,587,940 B2 * | 9/2009 | Hewitt ....................... 73/290 R |

* cited by examiner

*Primary Examiner* — Hezron E Williams
*Assistant Examiner* — Mark A Shabman
(74) *Attorney, Agent, or Firm* — Harness, Dickey & Pierce, P.L.C.

(57) ABSTRACT

A pneumatic sensor/indicator device includes a sensor assembly having a bellows receiving chamber and sensor housing. An elastic bellows is in the bellows receiving chamber. A shaft connects to the bellows so bellows extension/retraction causes shaft axial movement. A magnet connected to the shaft generates a field moving an indicator ring. An indicator dome connects to the sensor body. The indicator ring is in the sensor housing in a non-indicating condition and displaces into the indicator dome providing a visible indicating condition. A flexible sensor tube connected to the sensor/indicator device extends into a well tube having a level sensing tube extending therefrom. A well fluid level rising above a level sensing tube inlet end increases inlet pressure port pressure inducing bellows axial displacement causing indicator device movement toward the indicating condition. The dome and indicating ring are isolated from the well preventing well contents entering and fogging the dome.

7 Claims, 11 Drawing Sheets

PNEUMATIC INDICATOR FOR DETECTING LIQUID LEVEL

FIELD

The present disclosure relates to fluid level sensing devices.

BACKGROUND

This section provides background information related to the present disclosure which is not necessarily prior art.

In groundwater wells, landfill gas, landfill leachate recovery wells and condensate recovery wells, hereinafter generally referred to as "wells", there is a need to monitor liquid level in the well. If liquid level exceeds a preset level, action may be required to lower the liquid level so that methane recovery is not impacted. This may involve installing a pump, repairing an existing pump, adjusting vacuum levels, adjusting gas flow, and the like. Well liquid level status should be measurable without impacting the well environment. Well environments may be hazardous because of flammable gasses such as methane in the well, or chemicals in the leachate that corrode or damage test equipment, therefore use of electronic measurement devices directly in the well may be precluded. Measurement systems that require the well to be opened for manual liquid level measurement are also undesirable, particularly in wells operating under a vacuum to prevent outside air entering the well during a liquid level monitoring event. In addition, opening the well for liquid measurement can by itself affect the liquid level, and can further adversely impact methane recovery in methane recovery wells.

SUMMARY

This section provides a general summary of the disclosure, and is not a comprehensive disclosure of its full scope or all of its features.

According to several embodiments, a pneumatic sensor/indicator device includes a sensor assembly having a bellows receiving chamber created in a sensor housing, an inlet pressure port, and a reference port. An elastic bellows is positioned in the bellows receiving chamber. The bellows has an inner chamber isolated from the bellows receiving chamber and in communication with the inlet pressure port. The bellows receiving chamber external to the bellows is in communication with the reference port. An indicator dome connected to the sensor body. An indicator member is positioned in the sensor housing in a non-indicating condition and is axially displaced by an extension of the bellows into the indicator dome in an indicating condition where the indicator member is visible through the indicator dome.

According to other embodiments, a pneumatic sensor/indicator device includes a sensor assembly having a bellows receiving chamber created in a sensor housing. An elastic bellows is positioned in the bellows receiving chamber. A shaft is connected to the bellows such that extension or retraction of the bellows causes axial movement of the shaft. A magnet is connected to a connecting end of the shaft. An indicator dome is connected to the sensor body. An indicator member is positioned in the sensor housing in a non-indicating condition and is axially displaced into the indicator dome in an indicating condition where the indicator member is visible through the indicator dome.

According to additional embodiments, a flexible sensor tube connected to the sensor/indicator device extends into a well tube. A level sensing tube extends from the flexible sensor tube. A well fluid level rising above an inlet end of the level sensing tube thereafter increases inlet pressure port pressure inducing bellows axial displacement, causing the indicator member to reposition from the non-indicating condition toward the indicating condition. The indicating member is moved by a magnet so the indicating member can be isolated from the environment in the well to prevent contents of the well from condensing in and/or fogging the indicator dome. A reference port is provided so that the sensor/indicator device functions at atmospheric pressure, at vacuum pressure, or at pressures above atmospheric pressure.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
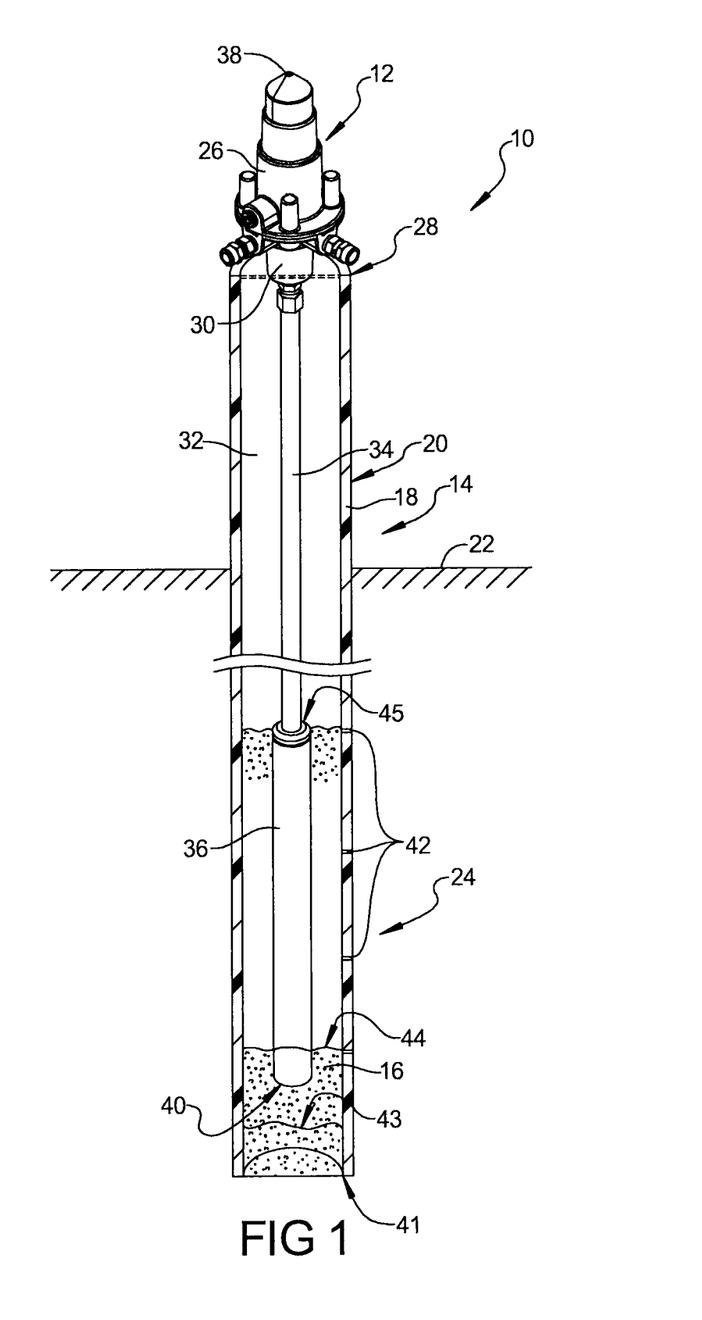
FIG. 1 is a partial cross sectional front elevational view of a pneumatic level sensor assembly of the present disclosure mounted to a methane recovery well assembly.

Referring to FIG. 1, a sensor system 10 includes a pneumatic level sensor assembly 12 which is either directly or indirectly connected to a well assembly 14. Level sensor assembly 12 is provided to indicate the presence of an undesirable level of fluid 16, such as leachate present in the well assembly 14. Well assembly 14 can include a well tube 18 commonly made of a metal, such as steel, or a plastic material, such as PVC. Well tube 18 commonly has an exposed well portion 20 positioned above a ground surface 22 and a buried well portion 24 positioned below the ground surface 22. Buried well portion 24 can extend from tens of feet to more than one hundred feet below ground surface 22.

Level sensor assembly 12 includes a sensor/indicator device 26 which can be directly or indirectly connected to a well top 28 of well tube 18. According to several embodiments, an inlet portion 30 of level sensor assembly 12 can be positioned at least partially within a well cavity 32 of well tube 18. A sensor tube 34, made for example of a thin-walled polymeric material, is connected to inlet portion 30 and extends for a predominant length of well tube 18 within both the exposed well portion 20 and the buried well portion 24. A level sensing tube 36, commonly made of a metal material such as stainless steel, is connected at a lower end of sensor tube 34. A length of level sensing tube 36 is predetermined such that fluid 16 within well cavity 32, which substantially fills level sensing tube 36, provides a visual indication or alarm in an indicator portion 38 of level sensor assembly 12.

Level sensing tube 36 is positioned within buried well portion 24 such that a tube inlet end 40 is positioned above a well tube lower end 41 at a distance from well tube lower end 41 that permits fluid 16 entering through a plurality of fluid inlet apertures 42 created through buried well portion 24 to reach an anticipated or normal liquid high level 43 which does not contact the tube inlet end 40. When fluid 16 in well cavity 32 is at or below the normal liquid high level 43, no visual indication is provided by indicator portion 38 of level sensor assembly 12. When fluid 16 rises within well cavity 32 and contacts tube inlet end 40 or rises above tube inlet end 40, for example to a sensed liquid level 44, the air/gas mixture contained within liquid level sensing tube 36 and sensor tube 34 is compressed, which causes a visual indication of this level change to be visible at indicator portion 38. As the level of fluid 16 in well cavity 32 rises toward a tube upper end 45 of level sensing tube 36, indicator portion 38 of level sensor assembly 12 visually indicates an increasing level alarm condition by further visual exposure of indicator portion 38. The indication point is a function of a length of sensor tube 34 and a length of liquid level sensing tube 36. According to several embodiments, the length of liquid level sensing tube 36 is approximately 45.7 cm (18 inches). The full or any intermediate level alarm condition can be seen by an operator monitoring sensor system 10 and provides a visual indication that the level of fluid 16 within well cavity 32 is above a desired level. The operator can then take remedial measures, such as operating a fluid pump, to reduce the level of fluid 16 within well cavity 32 back to the normal liquid high level 43 or below. The pump (not shown) can be operated until all visual indication of the fluid level indicated at indicator portion 38 is removed.

It is desirable to maintain the level of fluid 16 within well cavity 32 at or below the normal liquid high level 43 such that fluid and gas can enter the plurality of fluid inlet apertures 42 for subsequent removal of the gas, such as methane for methane recovery, from well cavity 32. High levels of fluid 16 within well cavity 32 can block the plurality of fluid inlet apertures 42 and can also be an indication of high water levels in the ground area surrounding well assembly 14, which can lead to erosion or well collapse. Level sensor assembly 12 operates entirely from a differential pressure sensed between fluid 16 within level sensing tube 36 and the pressure (normally a vacuum pressure) maintained within well cavity 32. Level sensor assembly 12 requires no outside power and provides a visual indication of an alarming condition.

Figure 2:
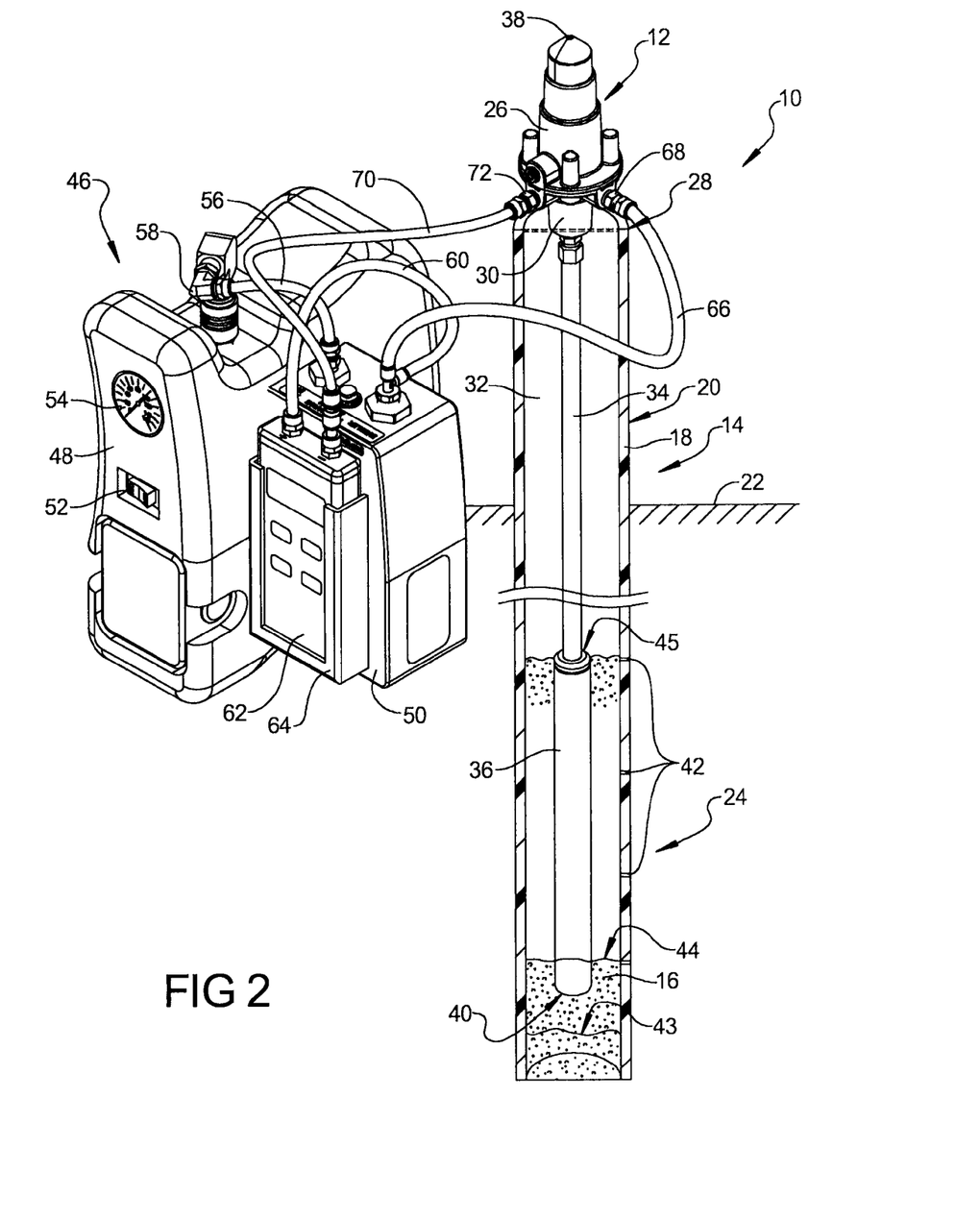
FIG. 2 is a partial cross sectional front elevational view of the level sensor assembly of FIG. 1 further connected to a control/measurement device.

Referring to FIG. 2, if the operator monitoring well assembly 14 sees a visual indication of a high liquid level by displacement at the indicator portion 38, the operator can take further remedial steps to determine the actual fluid level within well cavity 32. For example, the operator can connect a control/measurement device 46 to well assembly 14 via connections provided with level sensor assembly 12. Control/measurement device 46, according to several embodiments, can include a compressor assembly 48 which provides a source of pressurized air to a pressure regulator unit 50. Compressor assembly 48 is commonly provided with its own power source, such as a battery (not shown) and a compressor (not shown), which is operated by an on/off switch 52. A pressure indication meter 54 can be provided to provide visual indication to the operator of the compressor pressure. Compressed air is supplied by compressor assembly 48 via an air supply line 56 and a tubing connector 58 to pressure regulator unit 50. The pressurized air received in pressure regulator unit 50 is reduced to a desirable pressure (e.g., approximately 30 psi or another predetermined pressure) which is provided via an air bubbler sensing line 60 to a differential pressure measurement device 62, such as a manometer. Differential pressure measurement device 62 can be connected and portably released from pressure regulator unit 50 and can be releasably stored using a storage housing 64 connected to pressure regulator unit 50. The regulated pressurized air is also provided from pressure regulator unit 50 via an air bubbler line 66 to an air bubbler connection port 68 of level sensor assembly 12. A well atmosphere reference line 70, connected between a reference port 72 of level sensor assembly 12 and differential pressure measurement device 62, provides a reference pressure of well cavity 32. A differential pressure measured using differential pressure measurement device 62 between air bubbler connection port 68 and well atmosphere reference line 70, given the known pressurized air pressure provided by pressure regulator unit 50, provides an accurate indication of the actual level of fluid 16 above tube inlet end 40. The connection of air bubbler line 66 to air bubbler connection port 68 and the connection of well atmosphere reference line 70 to reference port 72 is by quick connect minimally invasive connectors such that the vacuum normally present in well cavity 32 is minimally affected by the connection of these tubes. This reduces the possibility that connection of control/measurement device 46 to well assembly 14 will itself significantly alter the level of fluid 16 within well cavity 32.

Figure 3:
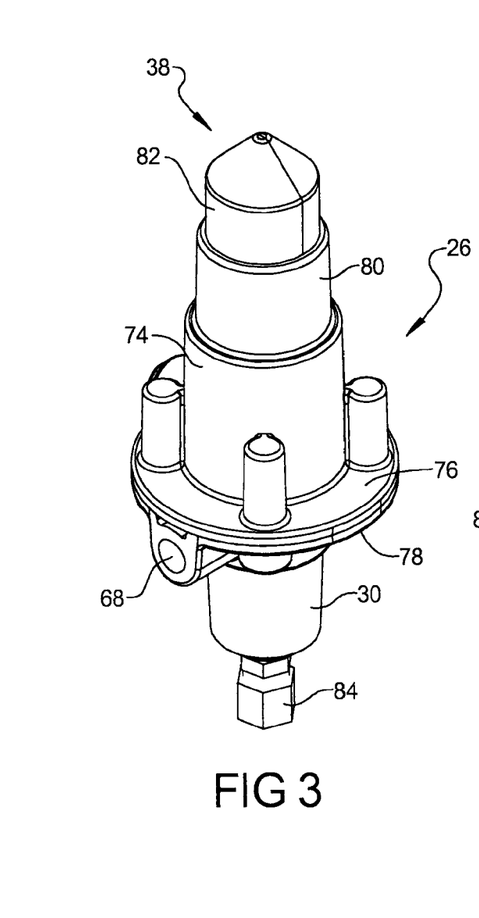
FIG. 3 is a top front perspective view of the level sensor assembly of FIG. 1.

Referring to FIG. 3, sensor/indicator device 26 includes a sensor housing 74 having a housing flange 76 which is mechanically and releasably connected to an inlet portion flange 78 of inlet portion 30. The releasable connection between housing flange 76 and inlet portion flange 78 allows for disassembly of sensor/indicator device 26 for maintenance, or to replace sensor/indicator device 26. Sensor housing 74, according to several embodiments, is made of a molded polymeric material and can further include a housing extension 80 integrally molded with sensor housing 74. Indicator portion 38 can include a transparent or semi-transparent indicator dome 82 releasably connected to housing extension 80. A sensor tube connector 84 is connected to inlet portion 30 and is provided for mechanical connection to sensor tube 34 shown in FIG. 1. Air bubbler connection port 68 is provided with inlet portion 30.

Figure 4:
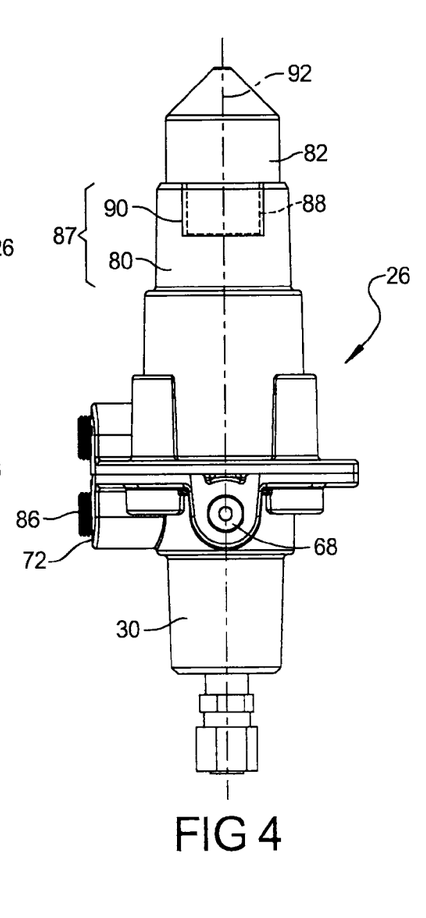
FIG. 4 is a front elevational view of the level sensor assembly of FIG. 3 in a normal non-indicating condition.

Referring to FIG. 4, reference port 72 is oriented approximately 90° with respect to bubbler connection port 68. A first plug 86 is shown threadably connected to reference port 72 to provide an atmospheric seal at reference port 72. First plug 86 can be removed and replaced by a quick release fitting (not shown) when actual pressure measurements are taken via sensor/indicator device 26.

Sensor/indicator device 26 further includes an indicator member 87 includes an indicator ring 88 made, for example, of a magnetically permeable material, such as steel, which is normally slidably disposed within housing extension 80 in a non-indicating condition shown. Indicator member 87 further includes an indicator label 90 affixed to an outer perimeter of indicator ring 88. According to several embodiments, indicator label 90 is adhesively applied to indicator ring 88 and is orange or red in color to be readily visible when indicator label 90 is positioned within indicator dome 82. Both indicator ring 88 and indicator label 90 attached to indicator ring 88 are slidably disposed within housing extension 80 and are axially movable with respect to a sensor longitudinal axis 92. The non-indicating condition of sensor/indicator device 26 shown is provided when indicator member 87 has indicator label 90 and indicator ring 88 retracted within the housing extension 80 such that indicator label 90 is not visible to a user or operator from the outside of sensor/indicator device 26.

Figure 5:
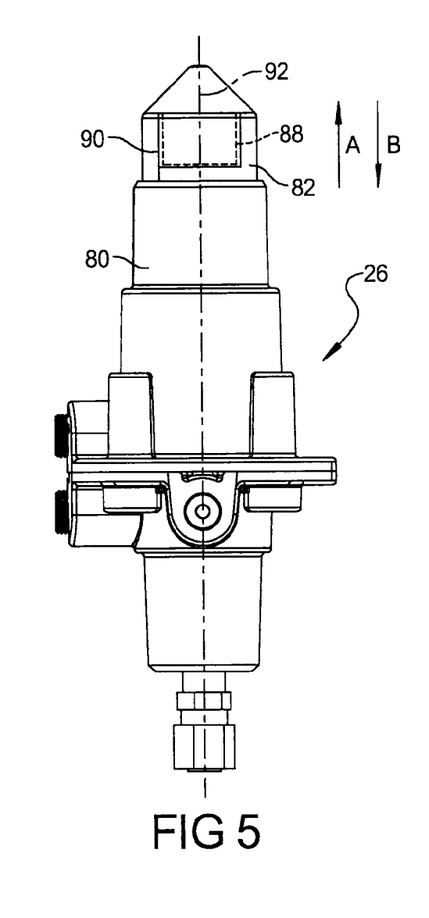
FIG. 5 is a front elevational view of the level sensor assembly of FIG. 3 in an indicating condition.

Referring to FIG. 5 and again to FIGS. 1 and 4, an alarm or indicating condition of sensor/indicator device 26 is shown. In the sensor indicating condition of indicator member 87, indicator ring 88 and indicator label 90 axially displace in an indicator extending direction "A" such that indicator label 90 is visible through indicator dome 82. This condition occurs when a high fluid level is present in the well assembly 14. When the fluid level within the well assembly 14 decreases below the sensing capability of sensor/indicator device 26, indicator ring 88 and indicator label 90 return in an indicator retracting direction "B" to the non-indicating condition shown in FIG. 4 where no visual indication of indicator label 90 is present through indicator dome 82.

Figure 6:
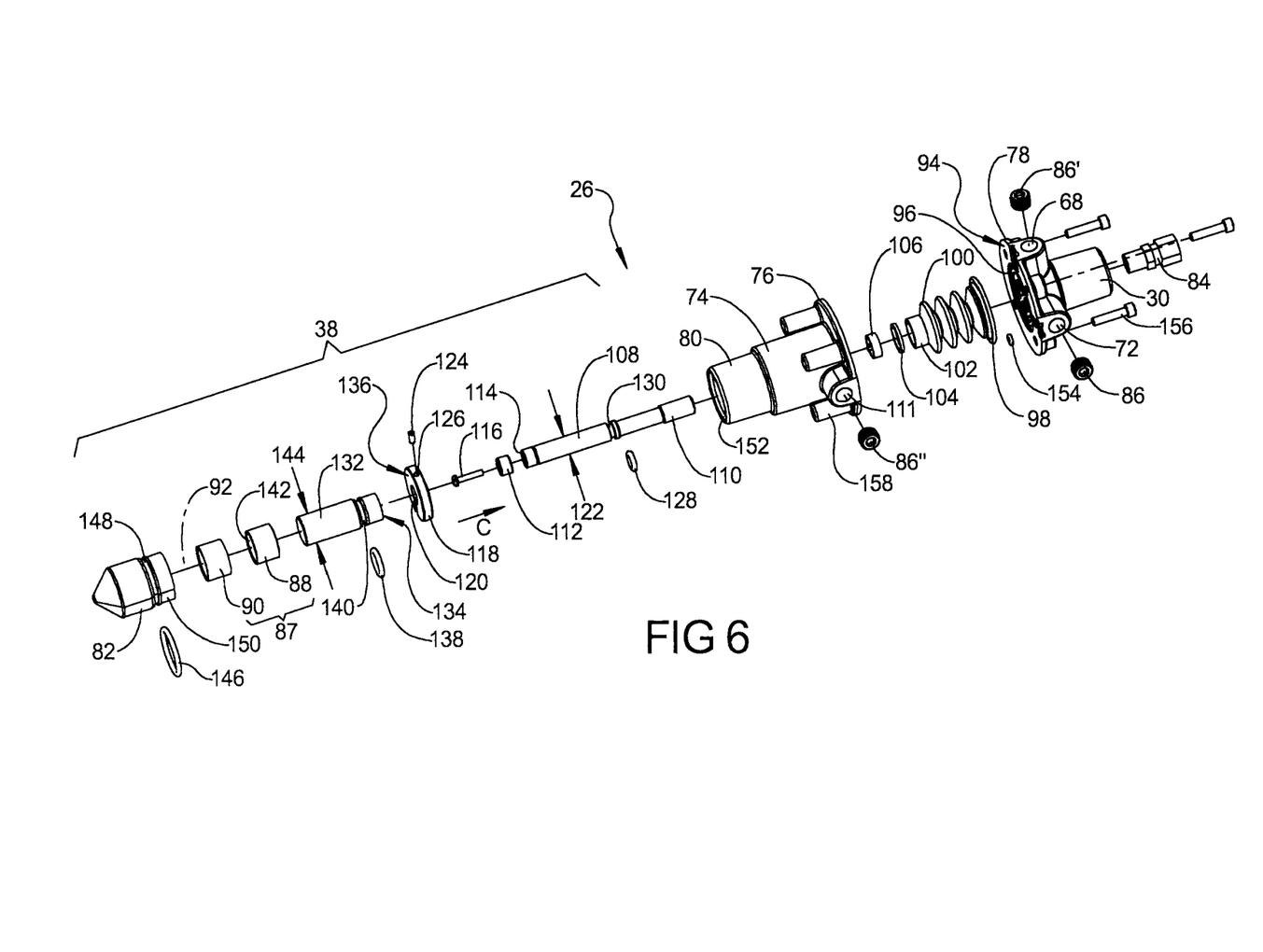
FIG. 6 is an assembly view of the level sensor assembly of FIG. 3.

Referring to FIG. 6, inlet portion flange 78 of inlet portion 30 has a flange face 94 into which a counter-bore 96 is created. Counter-bore 96 is sized to receive a seating flange 98 of a bellows 100 made from an elastic material such as a resilient polymeric material. Bellows 100 further includes a mounting ring 102 positioned at an opposite end with respect to seating flange 98. A washer 104 and a clamp 106 can be slidably received over an outer diameter of mounting ring 102 and used to releasably fix mounting ring 102 about a perimeter of a mounting portion 110 of a sliding shaft 108. Sensor housing 74 further includes a construction port 111 which can be sealed using a second plug 86". The purpose for construction port 111 will be described in greater detail in reference to FIG. 7.

Figure 7:
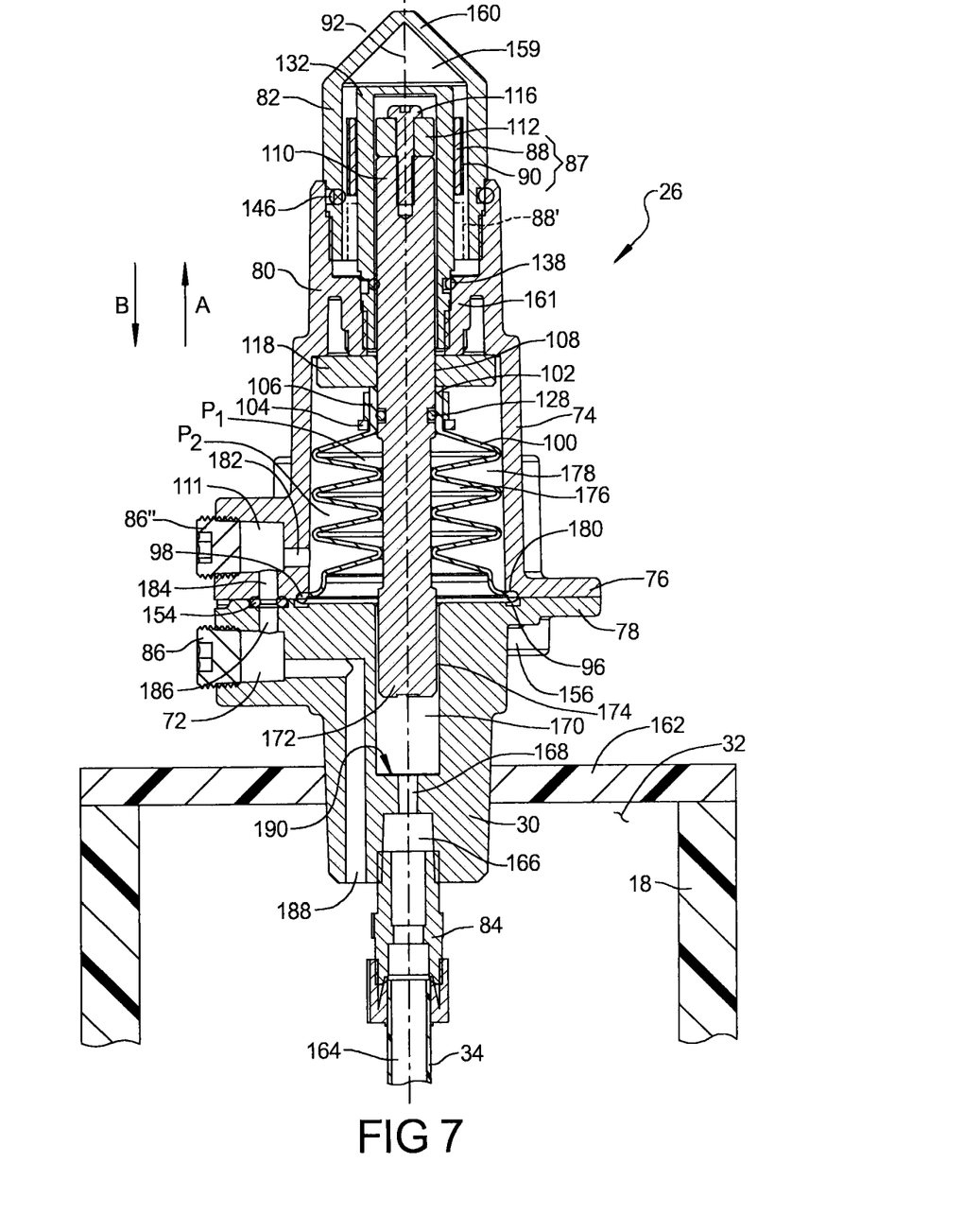
FIG. 7 is a cross sectional elevational view at section 7 of FIG. 1.

With continuing reference to FIG. 6 and again to FIG. 1, sliding shaft 108 is slidably disposed within sensor housing 74 and extends through housing extension 80. According to several embodiments a first magnet 112 can be releasably fixed to a magnet end 114 of sliding shaft 108 using a fastener 116 connected in an installation direction "C" to magnet end 114. According to further embodiments first magnet 112 is not used and the magnet end 114 of sliding shaft 110 can be itself magnetized. A stop member 118 made for example of a metal material includes a receiving aperture 120 which is sized to be slidably received over a mounting portion diameter 122 of sliding shaft 108. A set screw 124, threadably inserted through a threaded bore 126 of stop member 118 is inserted to releasably fix stop member 118 at a desired axial position along sliding shaft 108. Stop member 118 is slidably positioned in housing extension 80 and provides a sliding stop for axial outward motion of sliding shaft 108 as best shown in reference to FIG. 7. An O-ring 128 is positioned in an O-ring groove 130 created in sliding shaft 108 at an approximate mid-point of sliding shaft 108. One purpose of O-ring 128 is to create a fluid seal at the junction of sliding shaft 108 at its connection with bellows 100 to prevent gas or liquid entering bellows 100 from flowing into a tubular post 132 or indicator dome 82. Tubular post 132 is externally disposed over a portion of sliding shaft 108 with respect to sensor longitudinal axis 92 and is threadably engaged at a post threaded end 134 to a female threaded portion of a housing extension inner wall 161 in housing extension 80 shown and described in reference to FIG. 7. Sliding shaft 108 can therefore axially move within tubular post 132. As best seen in FIG. 7 a face 136 of stop member 118 contacts the housing extension inner wall 161 defining the outward axial stop position of sliding shaft 108. A second O-ring 138 is positioned in a second O-ring groove 140 created in tubular post 132. Second O-ring 138 prevents fluid and/or gas on the exterior side of bellows 100 or from the well assembly 14 from migrating beyond tubular post 132 and into the internal space of indicating dome 82, and thereby prevents fogging of indicating dome 82.

The indicator ring 88 includes an inner bore 142 which is sized to be slidably received with respect to a post diameter 144 of tubular post 132. Indicator ring 88 therefore can axially slide with respect to sensor longitudinal axis 92 about the post diameter 144 of tubular post 132. As previously described, the indicator label 90 is attached, for example using an adhesive, to the outer perimeter of indicator ring 88. Indicator label 90 can also be applied as a layer of paint to indicator ring 88, or can be eliminated if indicator ring 88 is provided with a visual color such as orange or red. Indicator dome 82 further includes a third O-ring 146 seeded in a third O-ring groove 148 created in an outer perimeter surface 150 of indicator dome 82. The third O-ring 146, together with second O-ring 138, provide atmospheric seals between perimeter surface 150 of indicator dome 82 and a housing inner bore 152 of housing extension 80 when perimeter surface 150 is slidably received in housing inner bore 152. A passage seal member 154 is also provided with the assembly of sensor/indicator device 26. The purpose for passage seal member 154 will be described in better detail in reference to FIG. 7. A plurality of sensor assembly fasteners 156 are inserted through apertures in inlet portion flange 78 to fastenably connect inlet portion 30, using a plurality of internally threaded or self-threading fastener receiving tubes 158, to sensor housing 74. Bellows 100 is positioned substantially within sensor housing 74 when inlet portion flange 78 is either releasably or permanently coupled to housing flange 76.

Referring to FIG. 7 and again to FIG. 1, sensor/indicator device 26 is shown in an exemplary installed condition with respect to well tube 18. Indicator dome 82 has an internal space 159, and as previously noted, is a transparent or semi-transparent material. Indicator dome 82 can further include a conical apex 160, which is provided to allow moisture and dirt to run off from the exposed upper surface of indicator dome 82, thereby minimizing the adherence of materials which can block the visibility of indicator label 90 through indicator dome 82. As previously noted indicator dome 82 is releasably engaged to housing extension 80 and hermetically sealed using third O-ring 146. The tubular post 132, slidably received within indicator dome 82, is atmospherically sealed using second O-ring 138 in contact with a housing extension inner wall 161 of housing extension 80 so that material, gas or fluid of well cavity 32 cannot enter internal space 159.

To simplify the following discussion of sensor/indicator device 26, a well cap 162 is shown having inlet portion 30 in sealing contact therewith. It is anticipated that during normal use sensor/indicator device 26 will be connected using one or more apertures created in well cap 162 that permit the extension and sealing of sensor tube 34 independently with respect to well cap 162, and therefore will provide a remote position for sensor/indicator device 26 with respect to well tube 18 and well cap 162. With sensor tube 34 connected to sensor tube connector 84 as shown, a tubing inner bore 164 is aligned with an inlet pressure port 166 of inlet portion 30. As fluid pressure within tubing inner bore 164 increases, caused by compression of the fluid/gas in level sensing tube 36 after fluid 16 contacts tube inlet end 40, the pressurized fluid will travel from inlet pressure port 166 through a pressure passage 168 into a cylinder bore 170 of inlet portion 30 to contact a piston end 172 of sliding shaft 110. Piston end 172 is slidably received within cylinder bore 170 such that sliding shaft 110 is axially movable with respect to sensor longitudinal axis 92. A diameter of piston end 172 is less than an inner diameter of cylinder bore 170 such that a clearance path 174 is provided for the pressurized fluid or gas received within cylinder bore 170 to transfer between cylinder bore 170 and a bellows inner chamber 176 of bellows 100.

A pressure $P_1$ in the inlet pressure port 166 substantially equals the pressure within bellows inner chamber 176. A pressure $P_2$ in reference port 72 is substantially equal to a pressure in a bellows receiving chamber 178 that is external to bellows 100. As pressure $P_1$ increases, pressure $P_1$ will exceed pressure $P_2$ in reference port 72 and therefore in bellows receiving chamber 178 that is external to bellows 100. This differential pressure between pressures $P_1$ and $P_2$ across bellows 100 causes bellows 100 to axially extend within bellows receiving chamber 178 in the indicator extending direction "A". Because clamp 106 releasably couples mounting ring 102 of bellows 100 to sliding shaft 110, extension of bellows 100 also co-translates sliding shaft 110 in the indicator extending direction "A". The axial extension of bellows 100 in the indicator extending direction "A" therefore displaces first magnet 112, or if first magnet 112 is not used, the magnetized magnet end 114 of sliding shaft 110, within tubular post 132 to the fully extended position shown. As first magnet 112 or the magnetized magnet end 114 of sliding shaft 110 axially translates in the indicator extending direction "A", the magnetic field generated by first magnet 112 or the magnetized magnet end 114 magnetically pulls the indicator ring 88 and thereby the indicator label 90 in the indicator extending direction "A" until indicator label 90 is at least partially visible through indicator dome 82.

Extension of bellows 100 in the indicator extending direction "A" continues until stop member 118 contacts extension inner wall 161 of housing extension 80, defining a fully or maximum extended position of indicator member 87. Indicator label 90 is fully visible through indicator dome 82 in the fully extended position. Indicator member 87 will remain in the extended condition until pressure $P_1$ reduces to or below pressure $P_2$. It is noted that indicator label 90 will also be at least partially visible through indicator dome 82 as first magnet 112 axially translates between the retracted and maximum extended positions.

When the pressure $P_1$ within bellows inner chamber 176 reduces to either equal to or less than pressure $P_2$, a weight of both sliding shaft 110 and stop member 118 pulls sliding shaft 110 with first magnet 112 in the indicator retracting direction "B" by the force of gravity until indicator ring 88 is returned to the retracted or non-indicating position shown in phantom as indicator ring 88'. It is further noted that indicator label 90 will also be at least partially visible through indicator dome 82 as first magnet 112 axially translates back to the retracted position.

Housing flange 76 can further include a housing flange counter-bore 180 which is aligned with counter-bore 96 in an assembled condition such that seating flange 98 of bellows 100 is retained within both counter-bore 96 and housing flange counter-bore 180 to radially restrain seating flange 98, while providing the compressive force required to hermetically seal seating flange 98. Bellows inner chamber 176 is therefore isolated from a bellows receiving chamber 178 defined by sensor housing 74. It is also noted that an upward travel limit for sliding shaft 110 and first magnet 112 is provided by stop member 118 when stop member 118 contacts housing extension inner wall 161 of housing extension 80.

With further reference to FIGS. 1 and 7, further internal fluid flow paths are provided within sensor/indicator device 26 as follows. Bellows receiving chamber 178 is in fluid communication with well cavity 32 via the following path. A bellows chamber flow port 182 extends between bellows receiving chamber 178 and construction port 111. Construction port 111 is provided such that bellows chamber flow port 182 can be created through the outer wall of sensor housing 74. A bellows chamber connecting passage 184 is oriented substantially perpendicular to construction port 111 and bellows chamber flow port 182. Bellows chamber connecting passage 184 is created through housing flange 76 and is coaxially aligned with a reference port connecting passage 186 created through inlet portion flange 78. Reference port connecting passage 186 opens into reference port 72. In turn, reference port 72 is connected, via a reference pressure passage 188 extending through inlet portion 30, to well cavity 32. The pressure within well cavity 32, which can be maintained as a positive pressure or at a partial vacuum, is therefore present within bellows receiving chamber 178, thereby providing a differential pressure between the higher pressure in bellows inner chamber 176 and the lower pressure within bellows receiving chamber 178 when fluid level within the well rises above tube inlet end 40. A higher pressure $P_1$ within bellows inner chamber 176, as fluid pressure increases within tubing inner bore 164, provides the driving force for displacing sliding shaft 110 and first magnet 112 (or the magnetized magnet end 114 of sliding shaft 110) and thereby provides visual indication of an increased fluid level within well cavity 32 as indicator ring 88 and indicator label 90 are magnetically upwardly displaced.

A bore end wall 190 is created at a lower end of cylinder bore 170. Bore end wall 190 provides a positive stop for a lower end travel path of piston end 172. Piston end 172 is provided and sized to maintain axial alignment of sliding shaft 110 during its sliding motion in the indicator extending direction "A" or the indicating retracting direction "B". The passage seal member 154 is positioned between housing flange 76 and inlet portion flange 78 to seal the junction between bellows chamber connecting passage 184 and reference port connecting passage 186. The sealing capability provided by seating flange 98 of bellows 100 and passage seal member 154 allows the installation of the sensor assembly fasteners 156 without requiring the use of additional seal members.

Figure 8:
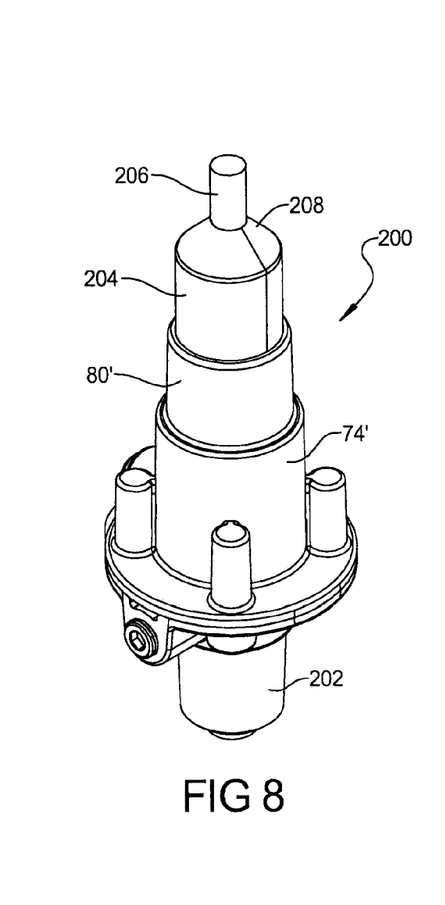
FIG. 8 is a top front perspective view of another embodiment of a level sensor assembly of the present disclosure.

Referring to FIG. 8 and again to FIG. 7, according to additional embodiments of the present disclosure, a sensor/indicator device 200 is modified from sensor/indicator device 26 by the inclusion of an inlet portion 202 releasably connected to sensor housing 74' and housing extension 80'. An indicator dome 204 is modified from indicator dome 82 and further includes an indicator retainer assembly 206 slidably received in a conical apex 208 of indicator dome 204.

Referring to FIG. 9 and again to FIG. 7, indicator ring 88' and indicator label 90' are shown in their retracted or non-indicating condition positioned within housing extension 80'. Indicator retainer assembly 206 is slidably disposed through an aperture 210 created in conical apex 208. A second magnet 212 is fastenably connected to a retainer tube 214 which can extend above conical apex 208 by an extension height "D". Second magnet 212 is therefore positioned within indicator dome 204.

Figure 9:
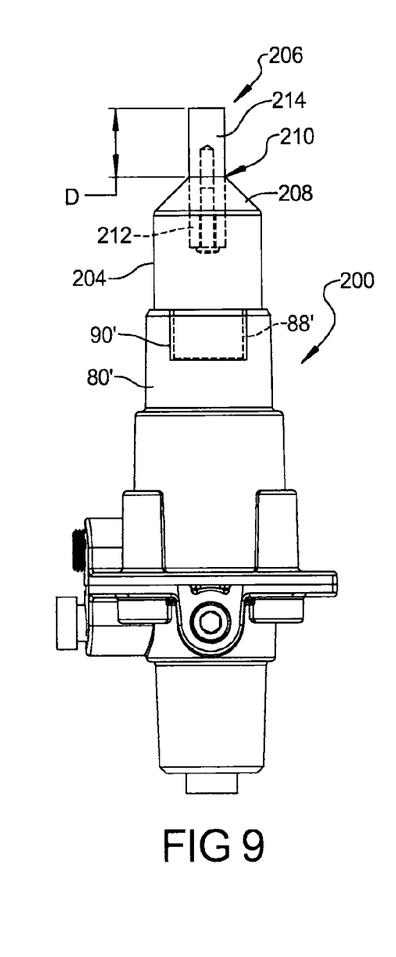
FIG. 9 is a front elevational view of the level sensor assembly of FIG. 8 in a normal non-indicating condition.
Figure 10:
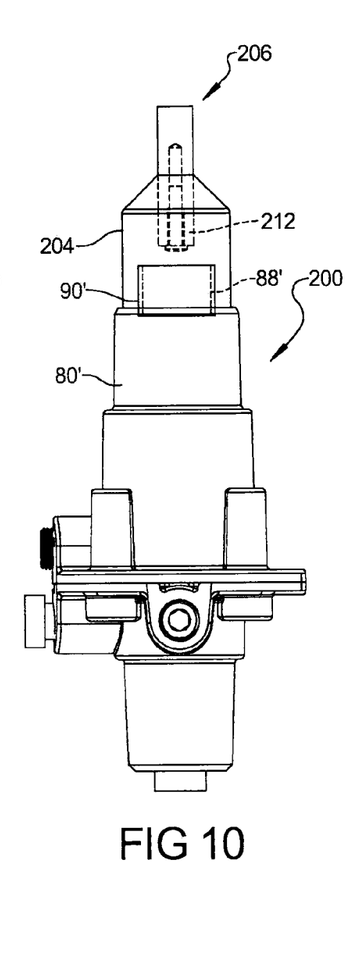
FIG. 10 is a front elevational view of the level sensor assembly of FIG. 8 in an indicating condition.

Referring to FIG. 10 and again to FIGS. 7 and 9, when indicator ring 88' and indicator label 90' extend to the indicating condition above housing extension 80' and therefore within indicator dome 204, indicator ring 88 comes within the magnetic influence of second magnet 212. Second magnet 212 can thereafter retain indicator ring 88' and therefore indicator label 90' in the extended position (indicating condition) shown after the pressure $P_1$ within sensor/indicator device 200 reduces to pressure $P_2$ re-establishing the non-indicating condition. The use of second magnet 212 can thereby provide for a continuing indication of an alarm or high fluid level condition whether the high fluid level condition is sustained or not. This can provide indication to an operator that a high fluid condition has occurred at any time following a last inspection of sensor/indicator device 200.

Figure 11:
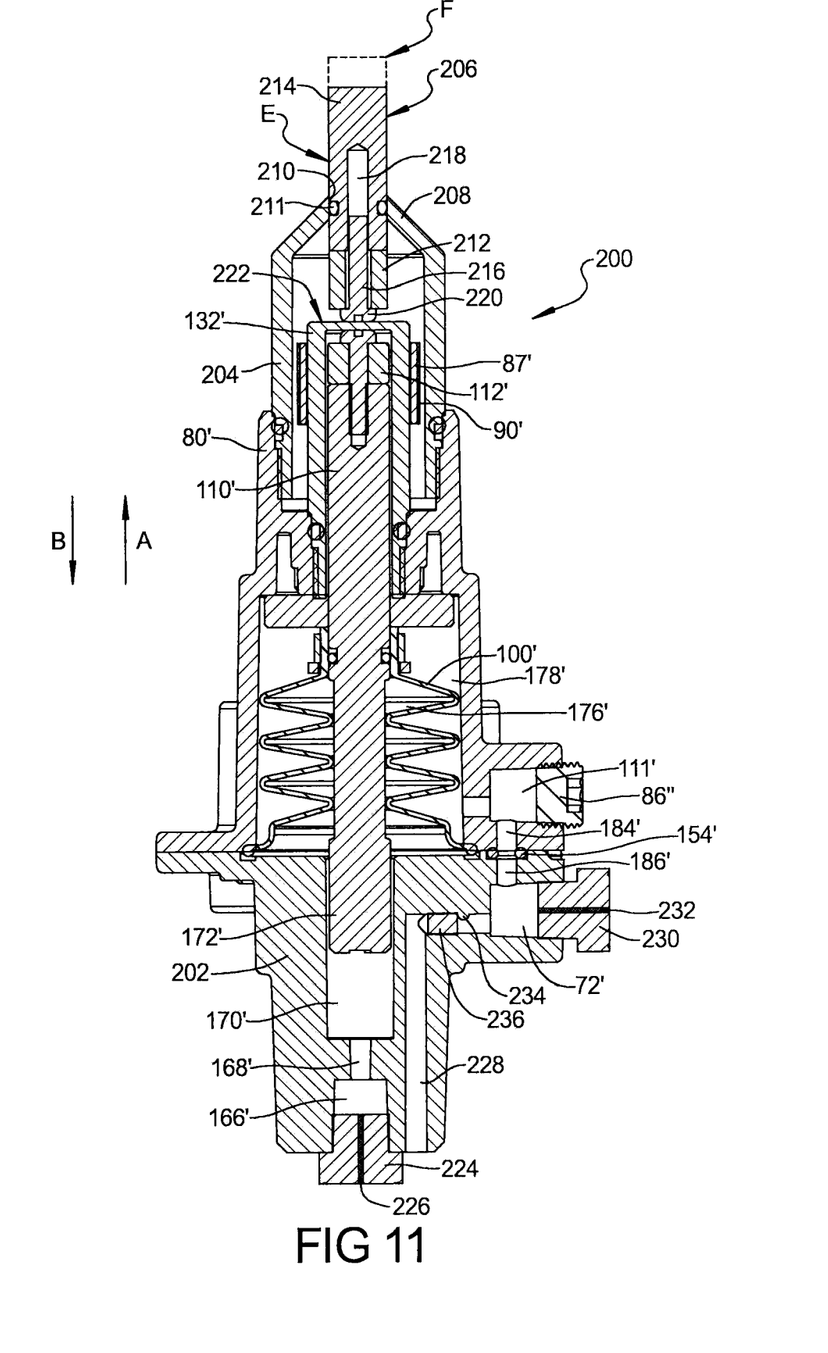
FIG. 11 is a cross sectional elevational view similar to section 7 of FIG. 1 showing a further embodiment of the level sensor.

Referring to FIG. 11, further components of sensor/indicator device 200 include an O-ring 211 engaged with a retainer tube 214, which seals aperture 210 at a junction between indicator retainer assembly 206 and conical apex 208. A fastener 216 releasably couples second magnet 212 to retainer tube 214 having fastener 216 threadably engaged in a threaded aperture 218 of retainer tube 214. A fastener head 220 of fastener 216 can contact a post end wall 222 of tubular post 132' when first magnet 112' is raised and positioned in its fully extended position in the indicator extending direction "A". The indicator retainer assembly 206 allows retainer tube 214 to be axially slidable partially into the indicator dome 204 in a first position "E" (shown in FIG. 11) providing the indicating condition of indicator member 87' and slidable away from the sliding shaft 110 to a second position "F" (shown in phantom) releasing indicator member 87' for return to the non-indicating condition.

A vented plug 224 is seated in inlet pressure port 166. Vented plug 224 can include a screened or filtered flow passage 226 which is provided to prevent passage of particulate matter into inlet pressure port 166'. A reference pressure passage 228 in the normal operating mode of this embodiment is blocked from reference port 72'. Reference port 72' is provided with a second vented plug 230 having a screened or filtered flow passage 232 similar to flow passage 226 of vented plug 224. Reference port 72' is in fluid communication with construction port 111' via bellows chamber connecting passage 184' and reference port connecting passage 186'. Reference pressure passage 228 is isolated from reference port 72' by use of a threaded connecting passage 234 having a threaded plug 236 installed therein. When threaded connecting passage 234 is blocked by threaded plug 236, bellows receiving chamber 178' can be directly vented to atmosphere via construction port 111', bellows chamber connecting passage 184', reference port connecting passage 186', reference port 72', and flow passage 232 of second vented plug 230. The differential pressure acting across bellows 100' is therefore the pressure within the flow passage 226 of vented plug 224 and atmospheric pressure at flow passage 232 of second vented plug 230. The configuration of FIG. 11 having threaded plug 236 installed can therefore be used in well applications that contain flammable gas such as methane gas and/or that can be directly vented to atmosphere.

Referring to FIG. 12 and again to FIG. 1, a sensor system 238 is modified from sensor system 10 and provides a pneumatic level sensor assembly 12 which is either directly or indirectly connected to a fluid tank 240. Fluid tank 240 can be any type of fluid holding tank, including but not limited to sump tanks, sewage treatment tanks, sludge tanks, underground water runoff tanks that may be accessible by a manway or manhole cover, and the like. Fluid tank 240 can include an outer wall 242, a tank bottom 244, and a tank top 246. Level sensor assembly 12 can have the sensor/indicator device 26 directly or indirectly mounted to tank top 246 or tank outer wall 242. Level sensing tube 36 is positioned within fluid tank 240 but a sensor tube 248 connecting level sensing tube 36 to sensor/indicator device 26 can be significantly shortened compared to sensor tube 34 to accommodate a height of fluid tank 240.

Figure 12:
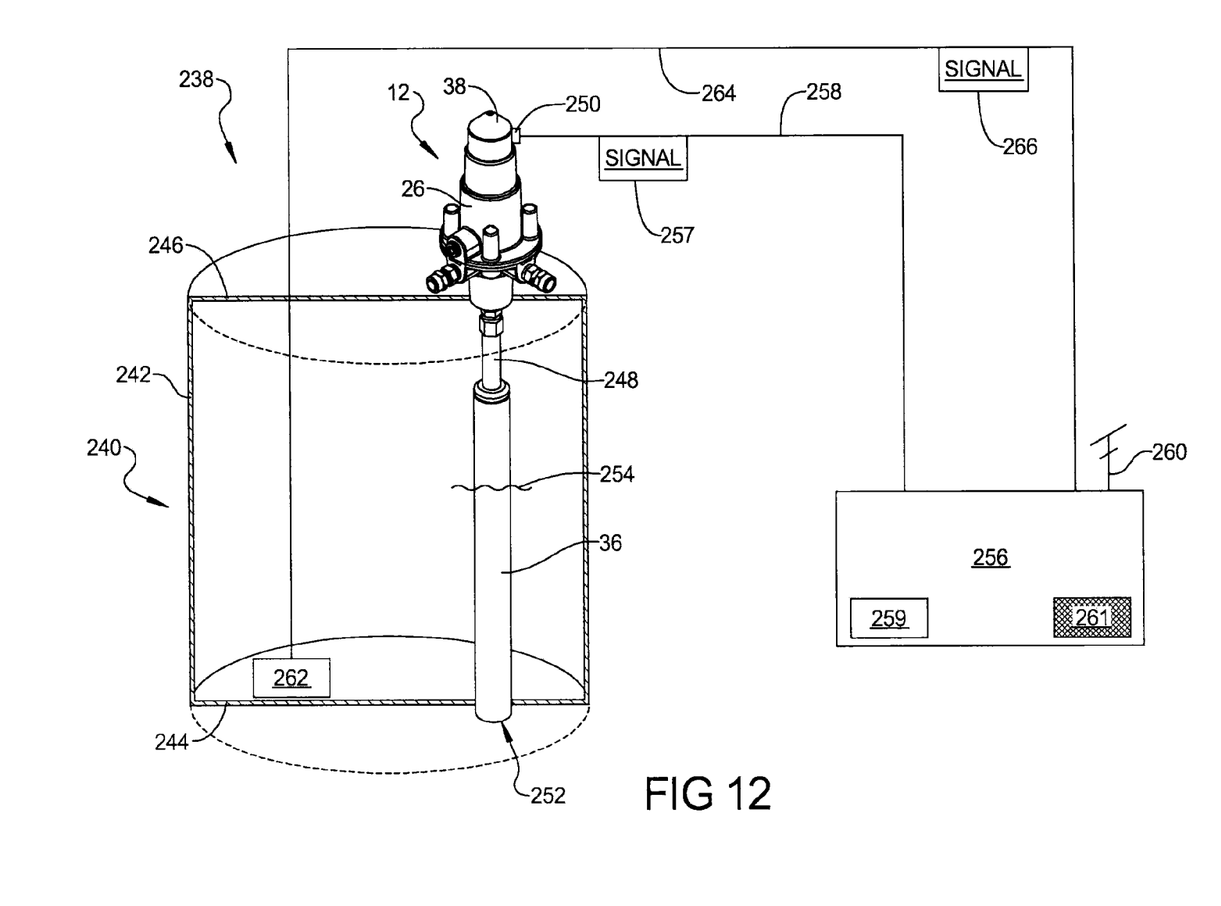
FIG. 12 is a partial cross sectional front elevational view of a level sensor assembly adapted for use in a tank.

An elevation of an inlet end 252 of level sensing tube 36 with respect to tank bottom 244 is chosen such that fluid entering level sensing tube 36 provides a visual signal at indicator portion 38. When a changing fluid level in fluid tank 240 reaches a predetermined fluid level 254, a high level indication signal is generated by a sensing device 250. According to several embodiments sensing device 250 includes a reed switch which closes to send the high level indication alarm signal as an electrical signal to a control system 256. The high level indication alarm signal can result from a predetermined differential pressure which corresponds to a difference between a first pressure in level sensing tube 36 as fluid reaches inlet end 252 and a second pressure corresponding to a water level reaching predetermined fluid level 254. The high level indication alarm signal can also be based only on a predetermined pressure when a water level reaches predetermined fluid level 254.

Control system 256 can be a program logic controller (PLC), a microcontroller, a datalogger, or similar device having a memory device 259. The control system 256 receives the high level indication alarm signal 257 from sensing device 250 via a communication line 258, and is pre-programmed to generate a corrective action signal 266. In addition to the visual alarm condition provided at indicator portion 38, the high level indication alarm signal 257 can also be sent to a remote site, for example by wireless transmission using a transmitter and antenna system 260 of control system 256, or by a direct communication channel. Control system 256 can also incorporate an audible alarm 261, or remotely trigger an audible alarm. The corrective action signal 266 can be for example an electrical signal forwarded from control system 256 to a fluid transfer device 262 via a communication path 264. The fluid transfer device 262 can be a pump, a venturi flow device, an electrically operated valve, or a similar device which operates to discharge fluid from fluid tank 240 until a fluid level in fluid tank 240 drops below either the predetermined fluid level 254 or inlet end 252. Control system 256 can compare the signal 257 to data in the memory device 259 to determine an approximate period of time for operation of fluid transfer device 262 based on fluid tank volume data stored, compare pressure signal data sensed by sensing device 250 to pressure data in memory device 259, or trigger operation of fluid transfer device 262 which can include its own level detection device, float, or the like to determine itself when to stop operating.

Referring to FIG. 13 and again to FIG. 12, according to further embodiments, a pneumatic level sensor/indicator device 268 is modified from pneumatic level sensor assembly 12 to incorporate sensing device 250 directly into a modified transparent or semi-transparent indicator dome 270. A U-shaped switch 272 such as a reed switch extends from sensing device 250 to a position above and proximate to indicator member 87" when indicator member 87" is in the fully extended position shown.

Figure 13:
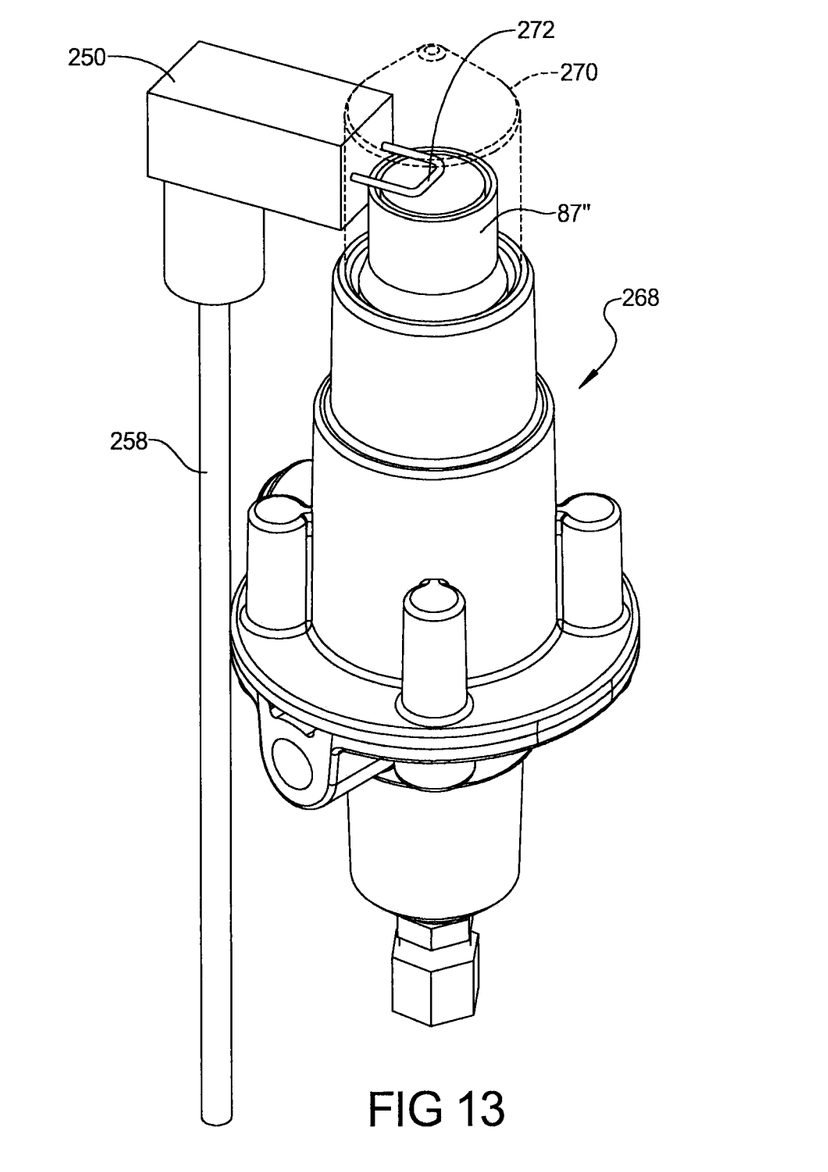
FIG. 13 is a front elevational view of another embodiment of a pneumatic level sensor assembly having an attached reed switch.

Referring to FIG. 14 and again to FIG. 13, switch 272 extends into an interior portion of indicator dome 270. Switch 272 can extend to the longitudinal axis 92' of level sensor/indicator device 268.

Figure 14:
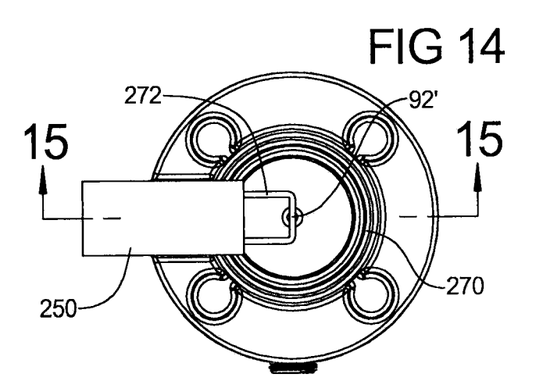
FIG. 14 is a top plan view of the level sensor assembly of FIG. 13
Figure 15:
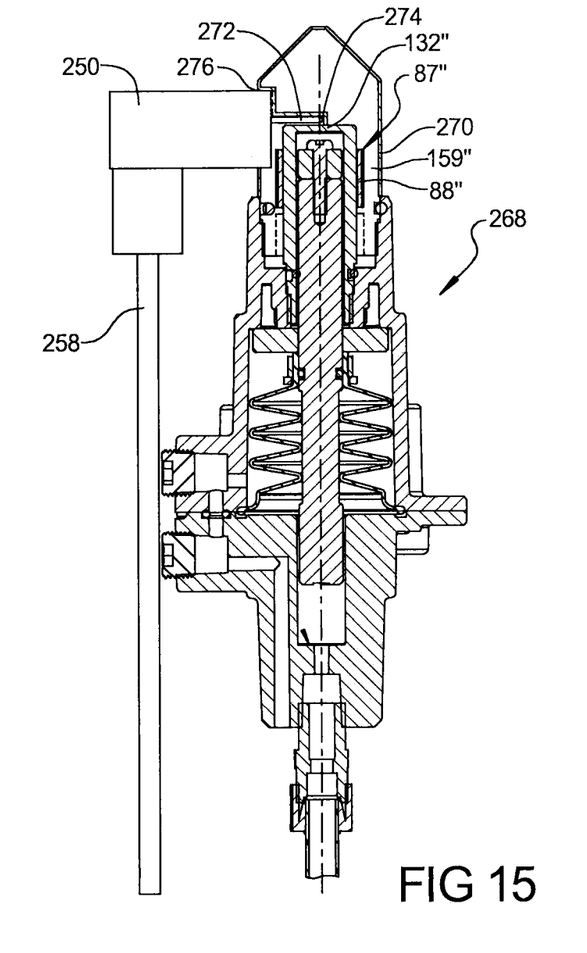
FIG. 15 is a cross sectional front elevational view taken at section 15 of FIG. 14.

Referring to FIG. 15 and again to FIGS. 13 and 14, switch 272 is positioned within an internal housing 274 created of the same transparent or semi-transparent material of indicator dome 270 when indicator dome 270 is molded, for example from an injection molding process. Internal housing 274 permits switch 272 to be removed from indicator dome 270 for service or replacement, and to seal the internal space 159' of indicator dome 270 from atmospheric contaminants. When indicator ring 88" of indicator member 87" is in the upward or extended position, switch 272 is activated which sends an electrical signal indicating a high fluid level condition via communication line 258. Sensing device 250 is weatherproof and is partially received and retained in a cavity 276 created in indicator dome 270.

Figure 16:
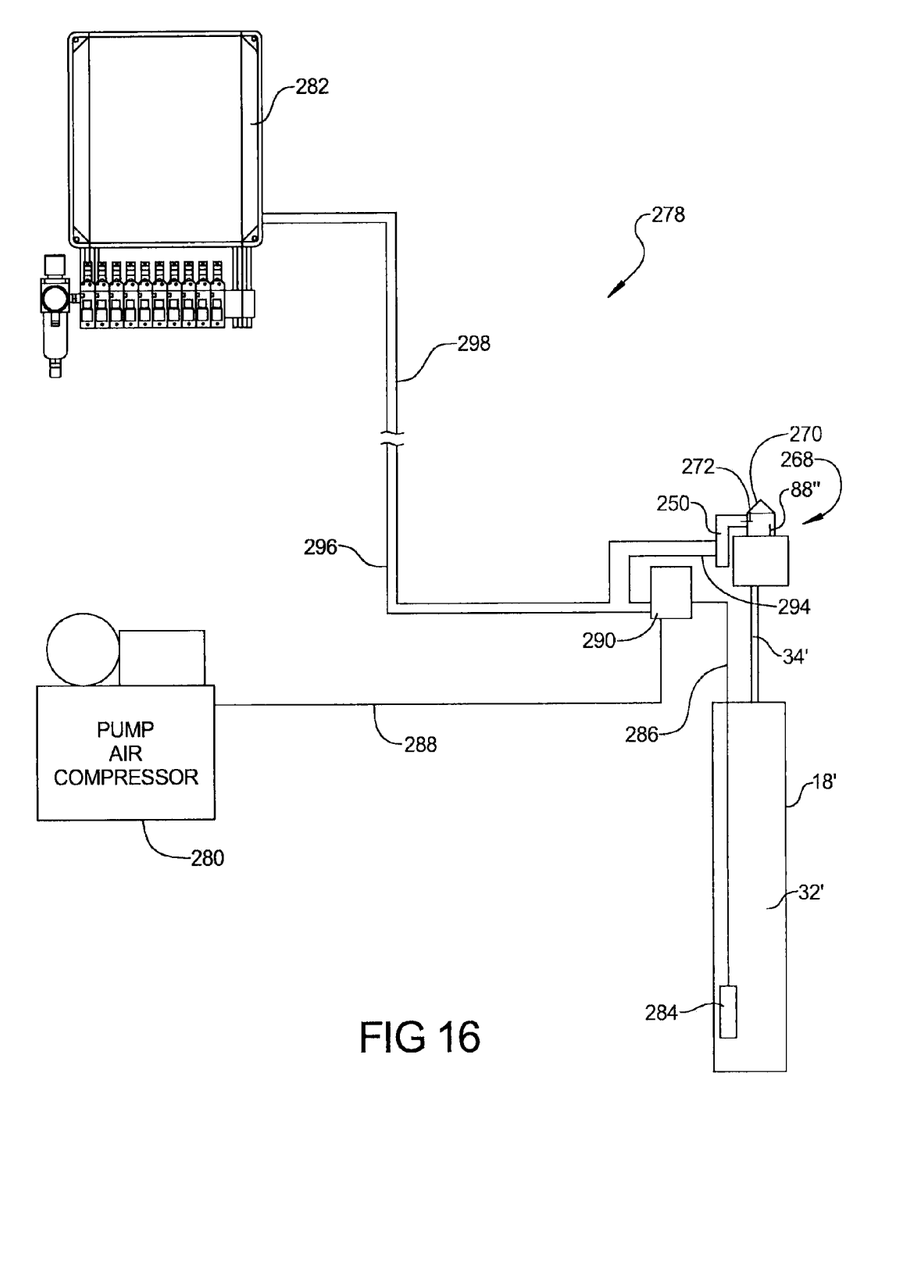
FIG. 16 is schematic for a control system using the level sensor assembly of FIG. 13.

Referring to FIG. 16, a remote sensing and operating system 278 using pneumatic level sensor/indicator device 268 includes the capability to remotely control operation of a pump/air compressor assembly 280 using a pump timer panel 282 remotely positioned from well cavity 32'. Level sensor/indicator device 268 is mounted to well tube 18' and uses sensor tube 34' as previously described herein. Pump/air compressor assembly 280 delivers air pressure to operate an air driven pump 284 positioned in well cavity 32' to remove liquid such as leachate from well cavity 32'. Air is delivered to pump 284 via a pump air line 286 which is connected to a pressure supply line 288 using a pump air solenoid valve 290. Pump air solenoid valve 290 is electrically controlled using a signal from switch 272 via a signal line 294 and from a signal transmission line 296 from pump timer panel 282. A second signal transmission line 298 from sensing device 250 is also connected to pump timer panel 282.

Pump timer panel 282, when receiving the high fluid level condition of well cavity 32' from sensing device 250 and switch 272 via second signal transmission line 298, signals pump air solenoid valve 290 to open allowing compressed air from pump/air compressor assembly 280 to operate pump 284. When indicator ring 88' moves downwardly away from switch 272 indicating the high fluid level condition is no longer present, the changed signal from switch 272 via pump timer panel 282 shuts pump air solenoid valve 290. Pump timer panel 282 is one example of a control unit for remote sensing and operating system 278. Pump timer panel 282 can also be replaced by a computer, a control chip/controller circuit, or similar logic device that can also remotely operate remote sensing and operating system 278 via a wireless transmission system as previously described herein, or via the Internet, so that an operator can monitor the fluid level status of multiple wells having multiple level sensor/indicator devices 268.

Pneumatic level sensor/indicator devices 26, 200, 268 of the present disclosure offer several advantages. By providing an internally sealed indicator ring having an indicator label 90 connected thereto which is displaced by magnetic attraction with a magnet or magnetized shaft moving in response to a pressure differential within the well, a local visual indication of a high fluid level within the well is provided without requiring the well to be opened or exposed to atmospheric pressure, while also preventing materials, fluids or gas within the well from contaminating the indicator label 90. By further use of an indicator retainer assembly 206 of the present disclosure, a high pressure or high fluid level indication occurring following a previous inspection will be retained such that the operator does not need to be present at the time the high fluid level occurs in the well. This provides the operator with the opportunity to conduct further tests to determine if high pressure in the well is a continuing condition warranting remediation or a condition that requires subsequent follow up. By further addition of an electrical switch or transmitter to the sensor/indicator devices or system, a remote sensing and well pump operating system can be controlled.

Pneumatic sensor/indicator devices of the present disclosure can also be used in an opposite manner, i.e., to provide visual indication of a falling fluid level in liquid storage tank. For this use and referring again to FIGS. 7 and 12, the presence of liquid in a liquid storage tank such as a cistern would be indicated by the visible presence of indicator member 87 in indicator dome 82. Downward motion of indicator member 87 would thereafter provide visual indication over time of a decreasing volume of useable liquid in the tank. The condition when indicator member 87 is completely disposed within housing extension 80 would provide, for example, visual indication that the tank requires refill, or impending loss of liquid supply.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. For example, a "well" or a "fluid tank" as referred to herein can broadly include any fluid containing member in which a liquid level can be present and sensed by a sensor/indicator device of the present disclosure.

What is claimed is:

1. A pneumatic sensor/indicator device, comprising:
    a sensor housing having a bellows receiving chamber created in the sensor housing;
    an inlet pressure port and a reference port;
    an elastic bellows positioned in the bellows receiving chamber, the bellows having an inner chamber isolated from the bellows receiving chamber and in communication with the inlet pressure port, the bellows receiving chamber external to the bellows being in communication with the reference port;
    an indicator dome connected to the sensor housing;
    an indicator member positioned in the sensor housing in a non-indicating condition and axially displaced at least partially into the indicator dome by extension of the bellows defining an indicating condition having the indicator member visible through the indicator dome;
    a shaft slidably disposed in the sensor housing, the bellows further being frictionally connected to the shaft at a mounting ring of the bellows such that longitudinal motion of the bellows causes axial motion of the shaft, a pressure in the inlet pressure port exceeding a pressure in the reference port causing an extending motion of the bellows and thereby axial motion of the shaft; and
    a first magnet connected to the shaft and thereby co-axially displaced during axial motion of the shaft, and further being operably associated with the indicator member to cause movement of the indicator member when axial motion of the shaft occurs.

2. The pneumatic sensor/indicator device of claim 1, wherein the indicator member further includes:
    an indicator ring of a magnetically permeable material;
    wherein the indicator ring is spatially and freely separated from and magnetically attracted to the first magnet such that the indicator ring is axially displaced by axial movement of the first magnet.

3. The pneumatic sensor/indicator device of claim 2, wherein the indicator member further includes an indicator label outwardly affixed to the indicator ring such that the indicator label is visible through the indicator dome when the indicator member is in the indicating condition.

4. The pneumatic sensor/indicator device of claim 1, further including a tubular post releasably connected to the sensor housing, the tubular post outwardly disposed with respect to the shaft, the indicator member located outwardly of and slidably disposed with respect to the tubular post.

5. The pneumatic sensor/indicator device of claim 1, further including a stop member connected to the shaft proximate to the mounting ring and axially displaceable within the bellows receiving chamber, the stop member when contacting an inner wall of the sensor housing stopping further displacement of the bellows within the bellows receiving chamber.

6. The pneumatic sensor/indicator device of claim 1, further including an indicator retainer assembly having a retainer tube axially slidable partially into the indicator dome to a first position and slidable away from the shaft to a second position.

7. The pneumatic sensor/indicator device of claim 6, wherein the indicator retainer assembly further includes a second magnet connected to the retainer tube, wherein when the indicator member is positioned in the indicating condition and the retainer tube is positioned in the first position the second magnet magnetically holds the indicator member in the indicating condition until the retainer tube is repositioned to the second position allowing the indicator member to return to the non-indicating position.

* * * * *

UNITED STATES PATENT AND TRADEMARK OFFICE
CERTIFICATE OF CORRECTION

PATENT NO.         : 8,756,991 B2                              Page 1 of 1
APPLICATION NO.    : 12/912101
DATED              : June 24, 2014
INVENTOR(S)        : David H. Edwards It is certified that error appears in the above-identified patent and that said Letters Patent is hereby corrected as shown below:

In the Specification

Column 6, Line 6: - before "bubbler" insert --air--

Signed and Sealed this
Seventh Day of October, 2014

Michelle K. Lee
*Deputy Director of the United States Patent and Trademark Office*